(12) United States Patent
Yabuki

(10) Patent No.: US 9,244,564 B2
(45) Date of Patent: Jan. 26, 2016

(54) INFORMATION PROCESSING APPARATUS TOUCH PANEL DISPLAY AND CONTROL METHOD THEREFOR

(75) Inventor: Masahiro Yabuki, Kanagawa (JP)

(73) Assignee: NEC Corporation, Tokyo (JP)

( * ) Notice: Subject to any disclaimer, the term of this patent is extended or adjusted under 35 U.S.C. 154(b) by 19 days.

(21) Appl. No.: 14/118,800

(22) PCT Filed: May 24, 2012

(86) PCT No.: PCT/JP2012/063256
§ 371 (c)(1),
(2), (4) Date: Nov. 19, 2013

(87) PCT Pub. No.: WO2012/161237
PCT Pub. Date: Nov. 29, 2012

(65) Prior Publication Data
US 2014/0085207 A1    Mar. 27, 2014

(30) Foreign Application Priority Data
May 24, 2011    (JP) ................. 2011-115885

(51) Int. Cl.
*G06F 13/12*    (2006.01)
*G06F 3/02*    (2006.01)
*G06F 3/041*    (2006.01)
(Continued)

(52) U.S. Cl.
CPC ............ *G06F 3/0416* (2013.01); *G06F 1/1694* (2013.01); *G06F 3/02* (2013.01); *G06F 3/0233* (2013.01); *G06F 3/0488* (2013.01); *H04M 1/72522* (2013.01); *G06F 2200/1614* (2013.01);
(Continued)

(58) Field of Classification Search
CPC ....... G06F 3/0416; G06F 3/02; G06F 3/0488; G06F 3/0233; G06F 2200/1614; H04M 1/72522; H04M 2250/12; H04M 2250/70; H04M 2250/22
See application file for complete search history.

(56) References Cited

U.S. PATENT DOCUMENTS 7,085,590 B2 *   8/2006   Kennedy et al. ........... 455/556.1
8,487,882 B2 *   7/2013   Inaba et al. .................... 345/173
(Continued)

FOREIGN PATENT DOCUMENTS

| CN | 101883175 | 11/2010 |
|---|---|---|
| JP | 2009-294850 | 12/2009 |
| JP | 2010-263433 | 11/2010 |

OTHER PUBLICATIONS

International Search Report corresponding to PCT/JP2012/063256, dated Jul. 11, 2012, 3 pages.
(Continued)

*Primary Examiner* — Henry Tsai
*Assistant Examiner* — Jing-Yih Shyu
(74) *Attorney, Agent, or Firm* — Wilmer Cutler Pickering Hale and Dorr LLP

(57) ABSTRACT

The present invention provides a technique for making it easy to operate an operator interface displayed on a touch panel display. A tilt detector detects the position of the apparatus. The touch panel display displays an image of the operator interface and senses touch by a touching object, where a predetermined process is performed in response to a touch action on the operator interface. A controller moves a display position of the image of the operator interface on the touch panel display in a direction in which an information processing apparatus tilts, according to changes in the apparatus posture detected by the tilt detector.

7 Claims, 5 Drawing Sheets

(51) Int. Cl.
*G06F 3/0488* (2013.01)
*G06F 1/16* (2006.01)
*H04M 1/725* (2006.01)
*G06F 3/023* (2006.01)

(52) U.S. Cl.
CPC ....... *H04M 2250/12* (2013.01); *H04M 2250/22* (2013.01); *H04M 2250/70* (2013.01)

(56) References Cited

U.S. PATENT DOCUMENTS

| | | | | |
|---|---|---|---|---|
| 8,902,187 | B2 * | 12/2014 | Han | 345/173 |
| 2004/0183834 | A1 | 9/2004 | Chermesino | |
| 2009/0081542 | A1 * | 3/2009 | Yageta et al. | 429/185 |
| 2010/0156798 | A1 | 6/2010 | Archer | |
| 2010/0241983 | A1 | 9/2010 | Walline et al. | |
| 2010/0241985 | A1 | 9/2010 | Kim et al. | |
| 2010/0285844 | A1 * | 11/2010 | Hosoi et al. | 455/566 |
| 2011/0057880 | A1 * | 3/2011 | Kasahara | 345/158 |
| 2011/0115817 | A1 * | 5/2011 | Chun | 345/629 |

OTHER PUBLICATIONS

Extended European Search Report issued by the European Patent Office for European Application No. 12789897.1 mailed on Jan. 23, 2015 (6 pages).

* cited by examiner

INFORMATION PROCESSING APPARATUS TOUCH PANEL DISPLAY AND CONTROL METHOD THEREFOR

CROSS-REFERENCE TO RELATED APPLICATIONS

This application is a national stage application of International Application No. PCT/JP2012/063256 entitled "Information Processing Apparatus and Control Method Therefor," filed on May 24, 2012, which claims the benefit of the priority of Japanese patent application No. 2011-115885, filed on May 24, 2011, the disclosures of each of which are hereby incorporated by reference in their entirety.

TECHNICAL FIELD

The present invention relates to an information processing apparatus equipped with a touch panel display.

BACKGROUND ART

In recent years, portable electronic devices, such as cell phones, smartphones, and portable multifunction devices, equipped with a touch panel display have spread worldwide. The trend of the display of these devices is towards increased size and many products having large 5 inch to 10 inch sized displays have appeared on the market.

On this type of portable electronic device, display sizes of objects such as icons depend on screen size, and consequently a portable electronic device equipped with a large-screen touch panel display displays objects in large size.

Patent Literature 1 proposes a technique for moving display the position of an object by tilting a device as well as a technique for changing the display size of the object as the display position of the object is moved.

CITATION LIST

Patent Literature

Patent Literature 1: JP2009-294850A

SUMMARY OF INVENTION

Technical Problem

As described above, when a screen is large, in the case of a portable electronic device that is equipped with a touch panel display, the objects that are displayed on display screen are also large. However, regarding input keys on the touch panel display, a large display size does not necessarily lead to convenience.

For example, when an operator interface containing plural input keys is displayed in large size, the range in which fingers need to be moved to enter desired characters becomes large, which may make it hard to enter inputs. Also, users who are used to enter characters with one hand on a cell phone may prefer to enter characters with one hand rather than enter characters with both hands on a QWERTY keyboard that occupies a large area on a large touch panel display.

On the other hand, the technique described in Patent Literature 1 mentioned above relates to the relocation of thumbnail images, where, in order to perform a process on an image, a thumbnail image can be moved to an appropriate icon location by tilting the device, but this does not contribute to arranging the input keys on the operator interface in such a way as to make operations of input keys easier.

An object of the present invention is to provide a technique for making it easy to operate an operator interface displayed on a touch panel display.

Solution to Problem

To achieve the above mentioned object, the present invention provides an information processing apparatus comprising: a tilt detector that detects an apparatus posture; a touch panel display that displays an image of an operator interface and senses touch of a touching object, where a predetermined process is performed in response to a touch action on the operator interface; and a controller that moves a display position of the image of the operator interface on said touch panel display in a direction in which the information processing apparatus tilts, according to changes in the apparatus posture detected by said tilt detector.

The present invention provides a control method for an information processing apparatus which includes a tilt detector that detects an apparatus posture, and a touch panel display that displays an image of an operator interface and senses touch of a touching object, where a predetermined process is performed in response to a touch action on the operator interface, the control method comprising moving a display position of the image of the operator interface on the touch panel display in a direction in which the information processing apparatus tilts, according to changes in the apparatus posture detected by the tilt detector.

The present invention provides a control program to be executed by a computer which includes a tilt detector that detects an apparatus posture, and a touch panel display that displays an image of an operator interface and senses the touch of a touching object, where a predetermined process is performed in response to a touch action on the operator interface, the control program causing the computer to execute procedures for moving a display position of the image of the operator interface on the touch panel display in a direction in which an information processing apparatus tilts, according to changes in the apparatus posture detected by the tilt detector.

Advantageous Effect of Invention

The present invention provides a technique for making it easy to operate an operator interface displayed on a touch panel display.

DESCRIPTION OF EMBODIMENTS

An exemplary embodiment will be described in detail with reference to the drawings.

Figure 1:
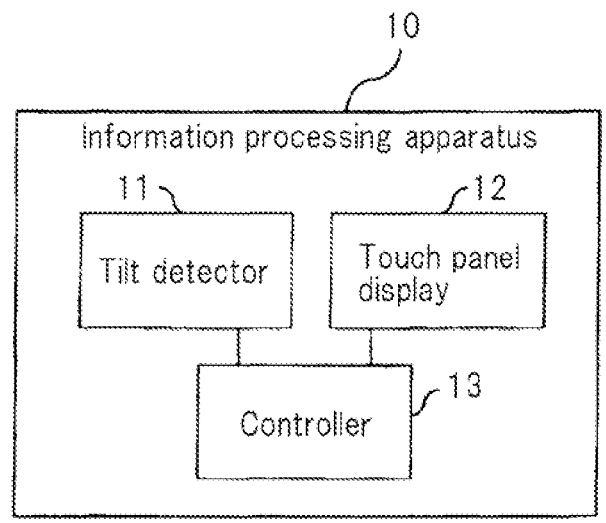
FIG. 1 is a block diagram showing a configuration of an information processing apparatus according to an exemplary embodiment.

FIG. 1 is a block diagram showing a configuration of an information processing apparatus according to the present exemplary embodiment. Referring to FIG. 1, information processing apparatus 10 includes tilt detector 11, touch panel display 12, and controller 13. A typical example of information processing apparatus 10 is a tablet portable electronic device.

Tilt detector 11 is, for example, an acceleration sensor, and is adapted to detect apparatus posture of information processing apparatus 10 and report posture information about the detected apparatus posture to controller 13.

Touch panel display 12, which is an input/display device combining an input device and display device, displays an image and senses touch of a touching object. Under the control of controller 13, touch panel display 12 displays an image of the operator interface containing input keys typified by QWERTY keys and numeric keys. Also, when a touching object such as a user's finger touches an input key of the operator interface, touch panel display 12 senses the touch and reports touch position information about touch position to controller 13.

Controller 13 is made up mainly, for example, of a microprocessor and is equipped with storage devices (not shown) such as a RAM and ROM as in the case of an ordinary computer device. By executing a program stored in the storage devices on the microprocessor, controller 13 performs various operations including those described below. Also, data used for processing as well as data generated by the processing are held in the storage devices.

According to changes in the apparatus posture detected by tilt detector 11, controller 13 moves a display position of the image of the operator interface on touch panel display 12 to a limited area near an end of touch panel display 12 in the direction in which information processing apparatus 10 tilts. The limited area can be an area in which it is easy to operate touch panel display 12, for example, with the thumb of the right or left hand that grips information processing apparatus 10 from the side. For example, an area close to the right or left side, neighboring or including the near corner is a good example.

Controller 13 senses a touch action on the operator interface based on the touch position information from touch panel display 12, and when a predetermined touch action is detected, controller 13 performs a process corresponding to the touch action. For example, when a touch action with respect to a certain character key is detected, controller 13 performs a character input process corresponding to the character key.

Figure 2:
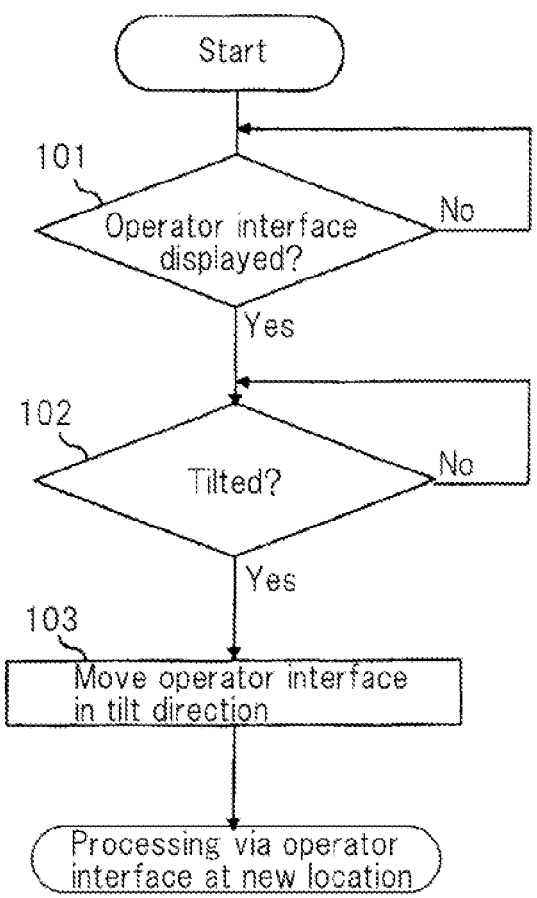
FIG. 2 is a flowchart schematically showing operation of information processing apparatus 10 according to the present exemplary embodiment.

FIG. 2 is a flowchart schematically showing the operation of information processing apparatus 10 according to the present exemplary embodiment. Basically, the operation of information processing apparatus 10 is controlled by controller 13.

Referring to FIG. 2, first, information processing apparatus 10 determines whether or not the operator interface including the input keys is displayed on touch panel display 12 (step 101). If the operator interface including the input keys is not displayed, information processing apparatus 10 repeats the determination in step 101 until the operator interface is displayed.

If the operator interface is displayed, information processing apparatus 10 determines next whether or not information processing apparatus 10 is tilted based on the posture information from tilt detector 11 (step 102). If information processing apparatus 10 is not tilted, information processing apparatus 10 repeats the process of step 102 until a tilt is detected.

Upon detecting that information processing apparatus 10 is tilted, information processing apparatus 10 moves the input keys and the like on the operator interface displayed on touch panel display 12 in a direction of the tilt (step 103). Subsequently, information processing apparatus 10 performs processing based on the touch on input keys on the operator interface displayed at a new location.

As described above, in the present exemplary embodiment, since information processing apparatus 10 moves a display position of the image of the operator interface on touch panel display 12 to an area near the end in the direction in which information processing apparatus 10 tilts, according to changes in the apparatus posture, the user can move the operator interface on touch panel display 12 to a location where it is easy to operate the operator interface, by tilting information processing apparatus 10. For example, this makes the character input operation easier.

Note that in the present exemplary embodiment, when moving the operator interface to a limited area, controller 13 may change the form of the input keys on the operator interface. For example, QWERTY keys for use with both hands may be changed to input keys for use with one hand such as is commonly the case for cell phones. Consequently, by tilting information processing apparatus 10, the user can display the input keys for use by one hand in an area near the end of touch panel display 12, thus making operation of the device by one hand easier.

Also, when the input keys on the operator interface are moved, the form of the input keys may be changed according to the angle at which information processing apparatus 10 is tilted. For example, the input keys may be changed to alphanumeric keys when information processing apparatus 10 is tilted 30 degrees, and to Japanese keys when information processing apparatus 10 is tilted 60 degrees. The user can move the input keys to a location where they are easy to operate, and can also change them to a desired form.

Also, while a touching object such as a finger touches the area of either the right or left side of the end of touch panel display 12, if information processing apparatus 10 is tilted to that side, controller 13 may move the operator interface to a limited area close to the end in the direction in which information processing apparatus 10 is tilted and near the touch location of the touching object. The user can also move the input keys to a location in the vertical direction where they are easy to operate.

Also, when moving the operator interface, controller 13 may reduce the size of the operator interface at the same time. Alternatively, controller 13 may move the operator interface in its current size to the limited area when information processing apparatus 10 is simply tilted, and move the operator interface in a reduced size to the limited area when information processing apparatus 10 is tilted after a predetermined touch action is performed with respect to touch panel display 12. When the user moves the operator interface, the user can easily make a selection to determine whether or not to reduce the size of the operator interface.

Also, when reducing the size of the operator interface containing input keys labeled with input characters, controller 13 may reduce the input characters of the input keys with a lower reduction ratio than the reduction ratio of the input keys on the operator interface. This will make it possible to maintain viewability of the input characters of the input keys even when the size of the input keys on the operator interface is reduced.

The operation of information processing apparatus 10 according to the present exemplary embodiment will be described in detail below.

Figure 3:
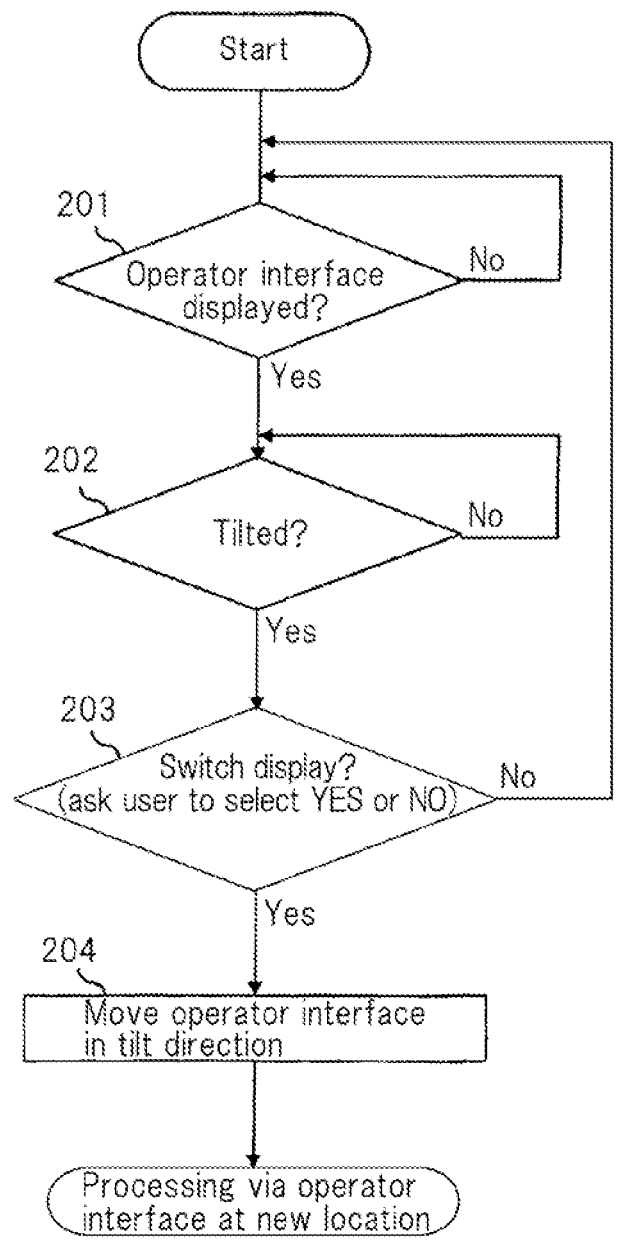
FIG. 3 is a flowchart showing a concrete operation example of information processing apparatus 10 according to the present exemplary embodiment.

FIG. 3 is a flowchart showing a concrete operation example of information processing apparatus 10 according to the present exemplary embodiment. In this operation example, the size of the operator interface is reduced at the same time as the interface is moved. Also, before the operator interface is moved, the user is asked whether the user wants to switch the input key display.

Referring to FIG. 3, first, information processing apparatus 10 determines whether or not the operator interface including the input keys is displayed on touch panel display 12 (step 201). If the operator interface is not displayed, information processing apparatus 10 repeats the determination in step 201 until the operator interface is displayed.

Figure 4:
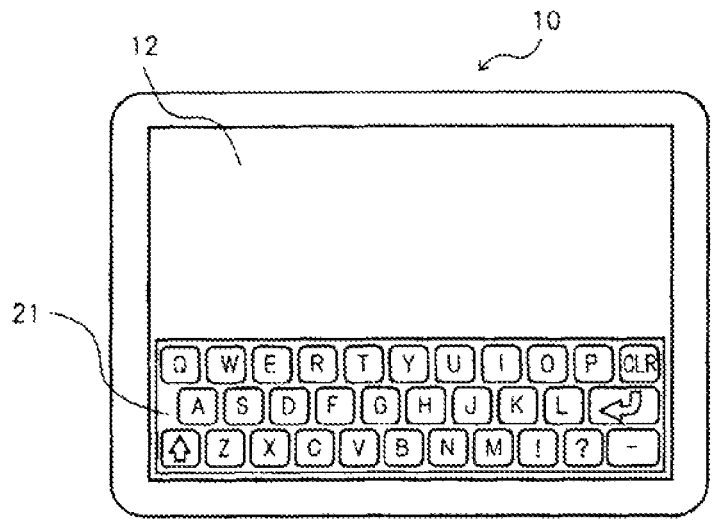
FIG. 4 is a diagram showing how information processing apparatus 10 looks when the operator interface is displayed.

FIG. 4 is a diagram showing how information processing apparatus 10 looks when the operator interface is displayed. Looking at FIG. 4, QWERTY-key operator interface 21 for two-handed operation is displayed on touch panel display 12.

As illustrated in FIG. 4, by way of example, if operator interface 21 is displayed, information processing apparatus 10 determines next whether or not information processing apparatus 10 is tilted, based on the posture information from tilt detector 11 (step 202). If information processing apparatus 10 is not tilted, information processing apparatus 10 repeats the process of step 202 until a tilt is detected.

Figure 5:
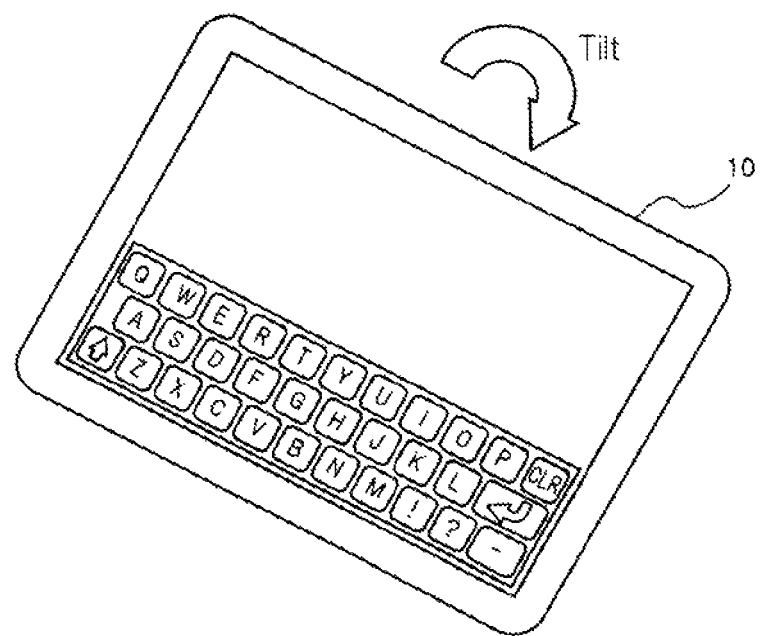
FIG. 5 is a diagram showing how information processing apparatus 10 looks when tilted.

FIG. 5 is a diagram showing how information processing apparatus 10 looks when tilted. Looking at FIG. 5, information processing apparatus 10 is tilted to the right.

Upon detecting that information processing apparatus 10 is tilted as illustrated in FIG. 5 by way of example, information processing apparatus 10 displays a confirmation window on touch panel display 12, presenting a message "Switch input key display?" and asking the user to select YES or NO (step 203). The confirmation window is displayed to avoid an unintended malfunction if the user tilts information processing apparatus 10 unwittingly or accidentally.

Note that FIG. 5 shows an example in which information processing apparatus 10 rotates clockwise in a plane parallel to the display surface of touch panel display 12, resulting in a determination that information processing apparatus 10 has been tilted rightward. In this example, if information processing apparatus 10 rotates counterclockwise in a plane parallel to the display surface of touch panel display 12, a determination can be made that information processing apparatus 10 has been tilted leftward.

However, the present invention is not limited to these examples. As another example, a determination can be made that information processing apparatus 10 has been tilted when information processing apparatus 10 rotates around a straight line parallel to a vertical direction of the display surface of touch panel display 12 in a plane parallel to the display surface. For example, a determination can be made that information processing apparatus 10 has been tilted rightward when information processing apparatus 10 rotates in a right-slanting direction around the straight line and a determination can be made that information processing apparatus 10 has been tilted leftward when information processing apparatus 10 rotates in a left-slanting direction.

Figure 6:
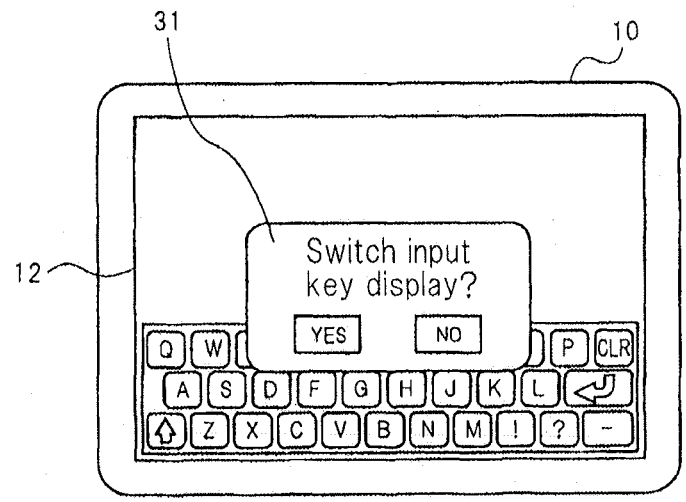
FIG. 6 is a diagram showing how information processing apparatus 10 looks when a confirmation window is displayed.

FIG. 6 is a diagram showing how information processing apparatus 10 looks when the confirmation window is displayed. Referring to FIG. 6, confirmation window 31 is displayed in the center of touch panel display 12, where confirmation window 31 contains a message "Switch input key display?" and contains input buttons that prompt the user to select YES or NO. Confirmation window 31 may be nontransparent or may be translucent to allow an underlying image to be seen therethrough.

When the user selects NO, information processing apparatus 10 makes confirmation window 31 disappear and returns to step 201. On the other hand, when the user selects YES, information processing apparatus 10 reduces operator interface 21 displayed on touch panel display 12 and moves in the direction of the tilt (step 204).

Figure 7:
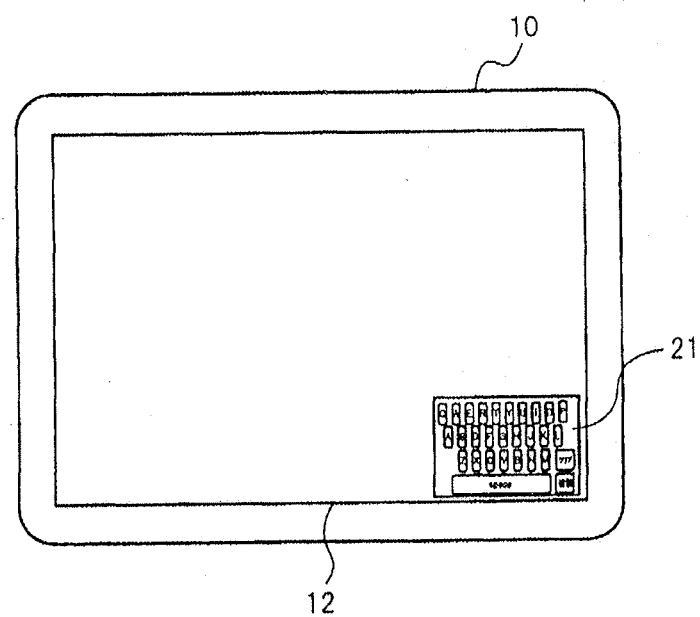
FIG. 7 is a diagram showing how information processing apparatus 10 looks when operator interface 21 is moved in a reduced form.

FIG. 7 is a diagram showing how information processing apparatus 10 looks when operator interface 21 is moved in a reduced form. Here, it is assumed that information processing apparatus 10 is tilted rightward as shown in FIG. 5. Looking at FIG. 7, the size of the operator interface 21 is reduced and displayed in an area close to the right side and lower side with its central position moved rightward. According to the present exemplary embodiment, it is assumed that when the central position of operator interface 21 is moved, any size reduction, transformation, or rotation of operator interface 21 performed at the same time will be included in the movement of operator interface 21.

Subsequently, information processing apparatus 10 performs processing in response to any of the input keys on operator interface 21 displayed in the new location being touched.

Figure 8:
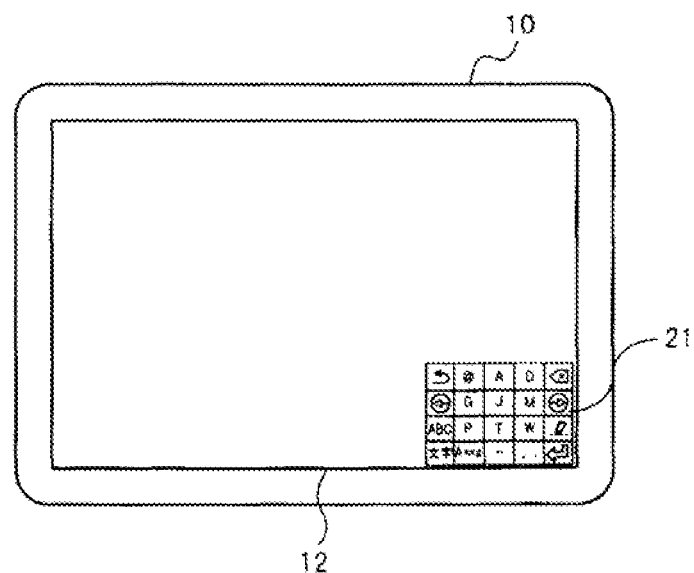
FIG. 8 is a diagram showing how information processing apparatus 10 looks when operator interface 21 is moved in a changed form.

Note that although FIG. 7 shows an example in which the size of the QWERTY keys on operator interface 21 is just reduced, the form of the input keys on operator interface 21 may be changed when operator interface 21 is moves. FIG. 8 is a diagram showing how information processing apparatus 10 looks when operator interface 21 is moved in a changed form. FIG. 8 shows operator interface 21 that has moved to the right side in which its form has changed from the QWERTY keyboard form, that is used for two hand key input operation, to simplified single hand key input form.

Also, although FIGS. 7 and 8 show an example in which operator interface 21 is moved to a bottom corner of touch panel display 12, the present invention is not limited to this. Operator interface 21 may be moved so as to set its vertical position to the neighborhood of that position on touch panel display 12 which is touched by a touching object.

Also, although FIG. 8 shows an example in which the form of the input keys change automatically when operator interface 21 moves, the present invention is not limited to this. As another example, the form may be changed according to the angle at which information processing apparatus 10 is tilted. For example, the input keys may be changed to alphanumeric keys when information processing apparatus 10 is tilted 30 degrees, and to Japanese keys when information processing apparatus 10 is tilted 60 degrees.

Also, although FIGS. 7 and 8 show an example in which after operator interface 21 is moved, it is displayed in the rectangular area, the present invention is not limited to this. It is assumed that the thumb is used for touch actions in the case of one handed input operation and thus after operator interface 21 is moved, it may be displayed in the area where touch operations can be performed with the thumb. In that case, operator interface 21 may be displayed in a fan-shaped area which allows touch actions to be performed with the thumb.

Figure 9:
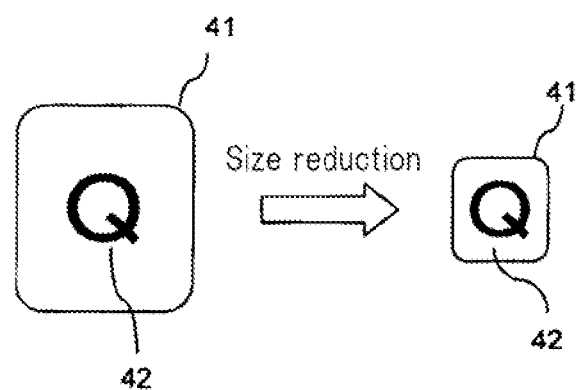
FIG. 9 is a diagram showing how an input key contained in operator interface 21 is reduced in size.

Also, in moving the QWERTY keys on operator interface 21 from FIG. 4 to FIG. 7 in a reduced form, the size of the input characters in frames of the input keys may be reduced in size with a lower reduction ratio than the reduction ratio of the frames of the input keys to maintain viewability of the input characters of the individual character input keys. FIG. 9 is a diagram showing how the size of the input key contained in operator interface 21 is reduced in size. In this example, the size of the input character 42 of Q in the frame of the input key is reduced with a lower reduction ratio than the reduction ratio of input key 41 used to enter "Q."

Also, although operator interface 21 that is made up of input keys for character input has been described as an example in the exemplary embodiment described above, the present invention is not limited to this. The present invention can be applied to any input key such as a key used to page through an e-book.

Also, in the example described above in the exemplary embodiment, operator interface 21 is automatically moved to the bottom corner of touch panel display 12 or moved to a position vertically corresponding to the position touched by a touching object, i.e., the display position of operator interface 21 after confirmation is made that operator interface 21 has moved both vertically and horizontally at the same time in a single action. However, the present invention is not limited to this. Operator interface 21 that has moved to the left or right side. Operator interface 21 that has moved is subsequently further movable in the vertical direction. Since operator interface 21 has already been moved to the left or right side, operator interface 21 may be moved to the upper limit direction by being dragged on touch panel display 12, as an example. As another example, operator interface 21 may be configured to move vertically when information processing apparatus 10 is rotated around a straight line parallel to the horizontal direction of the display surface in a plane parallel to the display surface of touch panel display 12.

Also, regarding reduction in the size of operator interface 21, in the example described above in the exemplary embodiment, operator interface 21 is reduced to a predetermined display size with a single action at the same time as operator interface 21 is moved to the left or right side, but the present invention is not limited to this. As another example, after operator interface 21 is moved to the left or right side or after operator interface 21 is moved to the left or right side while being reduced to a predetermined display size, the display size can be changed as desired. As an example, operator interface 21 can be changed in display size by being dragged on touch panel display 12. As still another example, the display size of operator interface 21 may be configured to be changed when information processing apparatus 10 is rotated around a straight line parallel to the horizontal direction of touch panel display 12 in a plane parallel to the display surface of touch panel display 12.

The configuration in which operator interface 21 is moved simultaneously with a reduction in its size via a single action provides the advantage that the time that is needed to improve ease of operation of operator interface 21, via movement and size reduction, can be decreased. On the other hand, the configuration in which operator interface 21 can be moved and whose size can be reduced by separate actions allows the user to adjust the display size as desired and set operator interface 21 to an easy-to-handle display size.

Although in the present exemplary embodiment, a tablet portable electronic device has been described as a typical example, the present invention is not limited to this. The present invention is widely applicable to cell phones, smartphones, portable audio devices, PDAs (Personal Digital Assistants), netbooks, e-book readers, multi-functional terminals, tablet personal computers, and the like.

Note that, controller 13 of information processing apparatus 10 according to the exemplary embodiment described above can be implemented by making a computer execute a software program that prescribes processing procedures for controller 13.

Also, part or all of the exemplary embodiment can be described as in the following supplementary notes. However, the present invention is not limited to the following supplementary notes.

(Supplementary Note 1)

An information processing apparatus comprising:

a tilt detector that detects an apparatus posture;

a touch panel display that displays an image of an operator interface and senses touch of a touching object, where a predetermined process is performed in response to a touch action on the operator interface; and a controller that moves a display position of the image of the operator interface on said touch panel display in a direction in which the information processing apparatus tilts, according to changes in the apparatus posture detected by said tilt detector.

(Supplementary Note 2)

The information processing apparatus according to supplementary note 1, wherein said controller moves the operator interface to a limited area at an end of said touch panel display in the direction in which the information processing apparatus tilts, according to the changes in the apparatus posture detected by said tilt detector.

(Supplementary Note 3)

The information processing apparatus according to supplementary note 1 or 2, wherein when moving the operator interface, said controller changes a form of input keys on the operator interface.

(Supplementary Note 4)

The information processing apparatus according to supplementary note 3, wherein when moving the operator interface, said controller changes the form of the input keys on the operator interface from character input keys for two-handed use to character input keys for one-handed use.

(Supplementary Note 5)

The information processing apparatus according to any one of supplementary notes 1 to 4, wherein said controller changes the form of the input keys displayed after the operator interface is moved, according to an angle at which the information processing apparatus is tilted.

(Supplementary Note 6)

The information processing apparatus according to supplementary note 2, wherein said controller moves the operator interface to a limited area located close to the end in the direction in which the information processing apparatus tilts and located in the neighborhood of a position touched by the touching object.

(Supplementary Note 7)

The information processing apparatus according to any one of supplementary notes 1 to 6, wherein said controller reduces the size of the operator interface while at the same time moving the operator interface.

(Supplementary Note 8)

The information processing apparatus according to supplementary note 7, wherein said controller reduces the size of the operator interface while at the same time moving the operator interface if the information processing apparatus is tilted after a predetermined touch action is performed with respect to said touch panel display.

(Supplementary Note 9)

The information processing apparatus according to supplementary note 7 or 8, wherein when reducing the size of the operator interface containing input keys labeled with input characters, said controller reduces the size of the input characters of the input keys with a lower reduction ratio than the reduction ratio of the input keys.

(Supplementary Note 10)

A control method for an information processing apparatus which includes a tilt detector that detects an apparatus posture, and a touch panel display that displays an image of an operator interface and senses touch of a touching object, when a predetermined process is performed in response to a touch action on the operator interface, the control method comprising moving a display position of the image of the operator interface on the touch panel display in a direction in which the information processing apparatus tilts, according to changes in the apparatus posture detected by the tilt detector.

(Supplementary Note 11)

A control method to be executed by a computer which includes a tilt detector that detects an apparatus posture, and a touch panel display that displays an image of an operator interface and senses touch of a touching object, when a predetermined process is performed in response to a touch action on the operator interface, the program causing the computer to execute procedures for moving a display position of the image of the operator interface on the touch panel display in a direction in which an information processing apparatus tilts, according to changes in the apparatus posture detected by the tilt detector.

The present application claims priority from Japanese patent application No. 2011-115885, filed on May 24, 2011, which is incorporated herein by reference in its entirety.

REFERENCE SIGNS LIST

10 Information processing apparatus
11 Tilt detector
12 Touch panel display
13 Controller
21 operator interface
31 Confirmation window
41 Input key
42 Input character

The invention claimed is:

1. An information processing apparatus comprising:
   a tilt detector that detects an apparatus posture;
   a touch panel display that displays an image of an operator interface and senses touch of a touching object, where a predetermined process is performed in response to a touch action on the operator interface; and
   a controller that moves a display position of the image of the operator interface on said touch panel display in a direction in which the information processing apparatus tilts, according to changes in the apparatus posture detected by said tilt detector;
   wherein when moving the display position of the image of the operator interface, said controller changes a form of input keys on the operator interface from character input keys for two-handed use to character input keys for one-handed use; and
   wherein said controller reduces the size of the operator interface while at the same time moving the operator interface.

2. The information processing apparatus according to claim 1, wherein said controller moves the operator interface to a limited area at an end of said touch panel display in the direction in which the information processing apparatus tilts, according to the changes in the apparatus posture detected by said tilt detector.

3. The information processing apparatus according to claim 1, wherein said controller changes the form of the input keys displayed after said operator interface is moved, according to an angle at which the information processing apparatus is tilted.

4. The information processing apparatus according to claim 2, wherein said controller moves the operator interface to a limited area located close to the end in the direction in which the information processing apparatus tilts and located in a neighborhood of a position touched by the touching object.

5. The information processing apparatus according to claim 1, wherein said controller reduces the size of the operator interface while at the same time moving the operator interface if the information processing apparatus is tilted after a predetermined touch action is performed with respect to said touch panel display.

6. A control method for an information processing apparatus which includes a tilt detector that detects an apparatus posture, and a touch panel display that displays an image of an operator interface and senses touch by a touching object, when a predetermined process is performed in response to a touch action on the operator interface, the control method comprising moving a display position of the image of the operator interface on the touch panel display in a direction in which the information processing apparatus tilts, according to changes in the apparatus posture detected by the tilt detector; wherein when moving the display position of the image of the operator interface, a form of input keys on the operator interface changes from character input keys for two-handed use to character input keys for one-handed use; and wherein said controller reduces the size of the operator interface while at the same time moving the operator interface.

7. A control program to be executed by a computer which includes a tilt detector that detects an apparatus posture, and a touch panel display that displays an image of an operator interface and senses touch by a touching object, when a predetermined process is performed in response to a touch action on the operator interface, the control program causing the computer to execute procedures for moving a display position of the image of the operator interface on the touch panel display in a direction in which an information processing apparatus tilts, according to changes in the apparatus posture detected by the tilt detector; wherein when moving the display position of the image of the operator interface, a form of input keys on the operator interface changes from character input keys for two-handed use to character input keys for one-handed use; and wherein said controller reduces the size of the operator interface while at the same time moving the operator interface.

* * * * *